United States Patent [19]

Mardon et al.

[11] 3,911,435
[45] Oct. 7, 1975

[54] DUAL FREQUENCY RADIOMETER

[76] Inventors: Austin Mardon, 1101 Mission Canyon, Santa Barbara, Calif.; Franklin H. Prestwood, 3482 Lincoln Ave., Valperaiso, Fla. 32580

[22] Filed: June 1, 1971

[21] Appl. No.: 150,864

Related U.S. Application Data

[63] Continuation-in-part of Ser. No. 41,870, June 1, 1970, abandoned.

[52] U.S. Cl.............. 343/100 ME; 324/7; 73/355 R
[51] Int. Cl.² .... H04B 7/00; G01V 3/12; G01J 5/00
[58] Field of Search ............ 343/100 ME; 324/4, 7; 73/355 R, 355 EM

[56] References Cited
UNITED STATES PATENTS

| | | | |
|---|---|---|---|
| 3,004,219 | 10/1961 | Albert.......................... | 343/100 ME |
| 3,028,596 | 4/1962 | McGillem et al. ...................... | 324/7 |
| 3,398,356 | 8/1968 | Still........................................ | 324/7 |
| 3,466,654 | 9/1969 | Abronson .................... | 343/100 ME |
| 3,599,211 | 8/1971 | Mardon ....................... | 343/100 ME |

*Primary Examiner*—Maynard R. Wilbur
*Assistant Examiner*—G. E. Montone
*Attorney, Agent, or Firm*—John E. Wagner

[57] ABSTRACT

Disclosed is a dual frequency radiometer concept whereby selection of operating frequencies allows the detection and discrimination of metal, water, tarmac, concrete and wet soil from natural terrain backgrounds.

Disclosed is one radiometry system designed to detect metal in the presence of background of normal terrain features, including vegetation, ground soil and water. Embodiments of the system are disclosed, employing two radiometer sensing heads operating at different preselected frequencies. The output of each sensing head is mixed with a respective locally generated signal $f_1$ and $f_2$ to produce a common IF frequency and alternately applied to an IF channel. The output of the IF channel is synchronously detected and the difference in level of radiometric energy at the two frequencies is synchronously detected and integrated to produce a difference signal indicative of the presence or absence of metal in the field of view.

In one embodiment, the local frequency sources are klystron oscillators and in the second embodiment, solid state Gunn diodes are used. The physical embodiment of one preferred form of sensing head is disclosed.

One third embodiment employs a single oscillator and multiplier to produce a second harmonic frequency. The fundamental and the second harmonic are used to serve as reference for the two superhet signal channels. Gain drift, frequency drift and oscillator noise cancellation are all achieved in this embodiment.

17 Claims, 9 Drawing Figures

INVENTOR
AUSTIN MARDON
BY John E. Wagner

DUAL FREQUENCY RADIOMETER

REFERENCE TO RELATED APPLICATIONS

This is a continuation in part of our co-pending application, Ser. No. 41,870, filed June 1, 1970, now abandoned.

BACKGROUND OF THE INVENTION

Since the last century, the relationship between the absorption and radiation of energy by a backbody has been recognized. Kirchoff deduced analytically that any body in thermal equilibrium at any temperature T radiates as much heat as it receives for any wavelength and termperature. Plank introduced the concept of the quantum as a definite fundamental unit of energy associated with frequency and he formulated the theory of the blackbody radiator in which various molecules behave as oscillators having the same frequency but different integer multiples of the energy result (Planck's Constant). The monochromatic emissive power as the statistical average of all contributing molecules is a function of the wavelength of the radiation of interest, and of the absolute temperature of the body. However, in the microwave energy region, the relationship is solely a function of the product of the absolute temperature and the bandwidth of the receiver and is independent of frequency.

It has been found that the effective temperature of any object is a function not only of its physical temperature but alos its reflectivity characteristics. Since few materials qualify as blackbody radiators and are thus less efficient radiators, the effective temperature at microwave frequencies is less than absolute thermometric temperature. The ratio of the effective to the absolute temperature is termed its emissivity ($\epsilon$). To comply with laws of thermodynamics, the same body must also reflect energy in proportion to unity minus the emissivity ($1-\epsilon$). This factor is termed the reflectivity coefficient ($\rho$).

Given these basic fundamentals, single frequency radiometric systems have been designed to discriminate between different objects and terrain features based upon the different effective temperature of each. In practice, it has been found that ground, grass and other vegetation, characteristic of normal terrain, have effective temperatures nearly equal to their absolute temperatures ($\epsilon \approx 1$) while concrete, tarmac and water have higher reflectivity coefficients $\rho$ and correspondingly lower emissivity coefficients. In other words, concrete, tarmac and water appear colder than the surrounding earth or terrain. Metal, being a good reflector of energy, also appears cold and, when viewed from above as from an aircraft, appears to reflect the cold sky temperature.

To ensure unambiguous detection of metal, a method of suppressing confusing background signals (particularly water) must be employed. The detectability of metal in the presence of water has been enhanced by a dual polarization scheme, the subject of a previous patent disclosure by one of the joint inventors of this patent application. Difficulties in implementation and a serious limitation in operational utility still left a need for further invention. Metal targets directly below the sensor, or at shallow depression angles, could not be discriminated from the background.

It will be noted that the sky temperature is frequency dependent because of the absorption (or radiation) characteristic of water vapor and oxygen gas present in the troposphere. Thus, metal and other reflectors of sky temperature will also exhibit frequency dependence. The selection of frequencies, in accordance with one embodiment of this invention, maximizes the differential in sky temperature as imaged by metal surfaces and thereby enhances the detectability of metals in the presence of all backgrounds.

BRIEF STATEMENT OF THE INVENTION

We have discovered that it is possible to develop a radiometer system capable of discriminating between metal and background material, including earth, vegetation and water with a minimum of false alarms. The system is passive as contrasted with radiating systems, such as radar.

The system utilizes the marked frequency dependence characteristics of sky temperature at selected frequencies to distinguish good reflectors, particularly metal from the background. The system employs a pair of side-by-side sensing heads (or orthogonal feeds to a common aperture) directed toward the same field of view with one tuned to a selected frequency $f_1$ and the second to a different frequency $f_2$. The two sensing heads are polarized, one in the E plane and the second in the H plane. These frequencies, $f_1$ and $f_2$, are selected such that with a processing circuit, we may distinguish between objects of interest, i.e., metal, and reflecting elements of the background. The foregoing is accomplished by processing the information sensed in a differential mode and signalling the presence of metal when a difference in level at the two preselected frequencies above a threshold occurs. The circuitry employs a pair of local oscillators and respective mixers coupled to each respective antenna or sensing head. The local oscillators are chosen to produce a common intermediate frequency. The switch alternately samples these two antenna temperatures and the two converted signals are synchronously detected. The difference in level of the two channels is indicative of the presence or absence of metal.

In one embodiment, the oscillators used are klystron type with multipliers while in another embodiment, the oscillators are semiconductive devices, such as Gunn diodes.

In a third embodiment, where harmonically related frequencies are selected and generated by a common reference oscillator, system stability and performance is enhanced through inherent automatic drift compensation and noise cancellation.

In a fourth embodiment, the detected outputs of the two parallel channels sensitive to thermionic energies at $f_1$ and $f_2$ are coupled to a differential amplifier. When the channel gains are balanced, the output of this amplifier is solely a function of the difference in the two antenna temperatures.

BRIEF DESCRIPTION OF THE DRAWINGS

The foregoing features of this invention may be more clearly understood from the following detailed description and by reference to the drawings in which.

DETAILED DESCRIPTION OF THIS INVENTION

Figure 1:
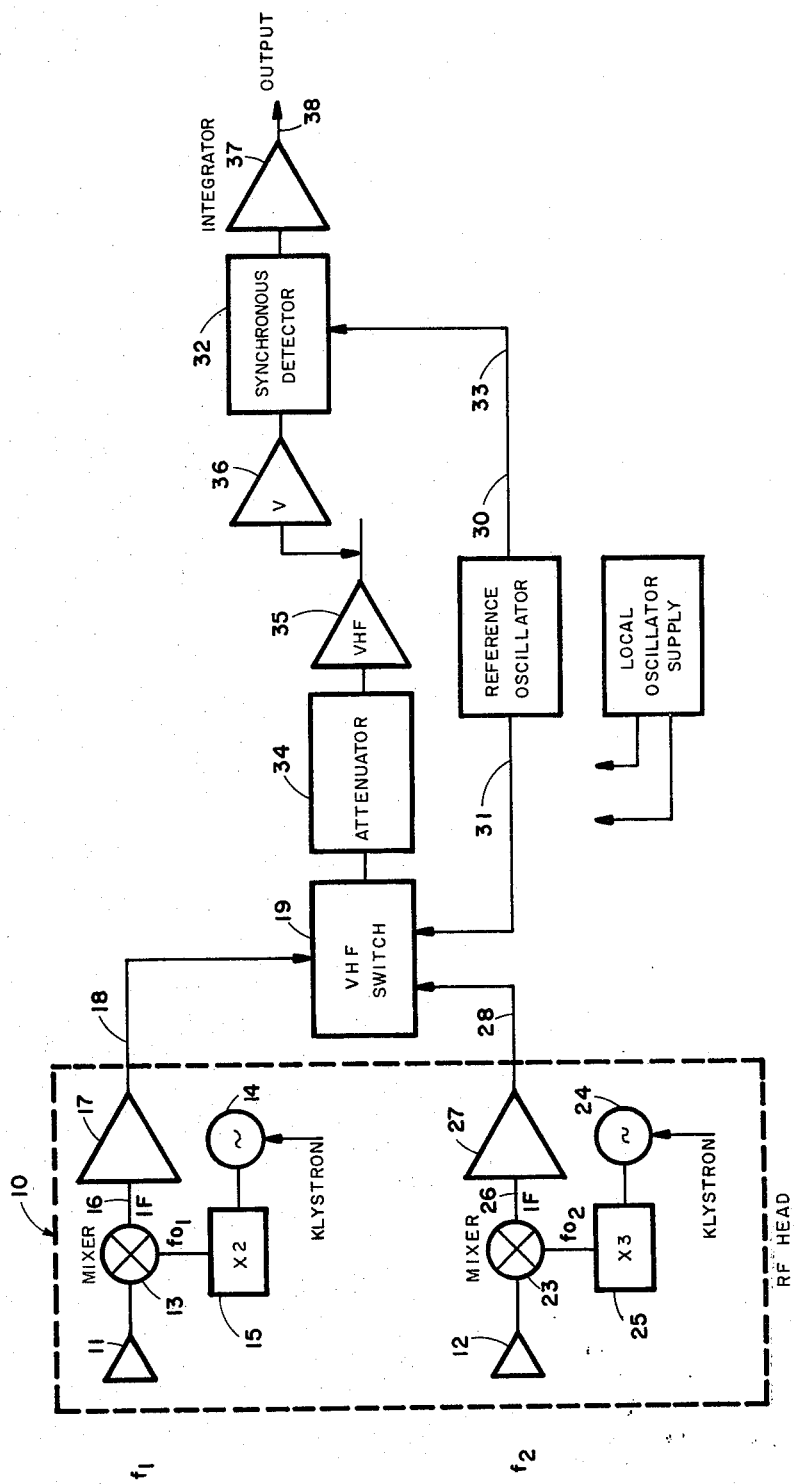
FIG. 1 is a block diagram of one embodiment of this invention.

Now referring to FIG. 1, a radiometer system in accordance with this invention may be seen comprising a sensing head assembly 10 designed to be installed on an aircraft, vehicle or possibly a fixed location with a pair of antennae 11 and 12 positioned in generally side by side relationship and directed toward a common field of view. The antennae 11 and 12 may be microwave energy receptors of any type with the antenna 11 turned to one frequency $f_1$ and antenna 12 tuned to a second frequency $f_2$ which are selected in accordance with the teaching of this invention. Antenna 11 is connected by a wave guide or similar microwave energy conductor to a mixer or converter 13 of a superheterodyne receiver. The local oscillator of the receiver in this embodiment is a klystron oscillator 14 and multiplier 15 which are designed to produce a first local frequency $fo_1$ which is mixed with the incoming signal $f_1$ to produce the first IF signal on lead 16. This signal is introduced into amplifier 17 and then conducted via lead 18 from the amplifier 17 to a switch 19.

Figure 3:
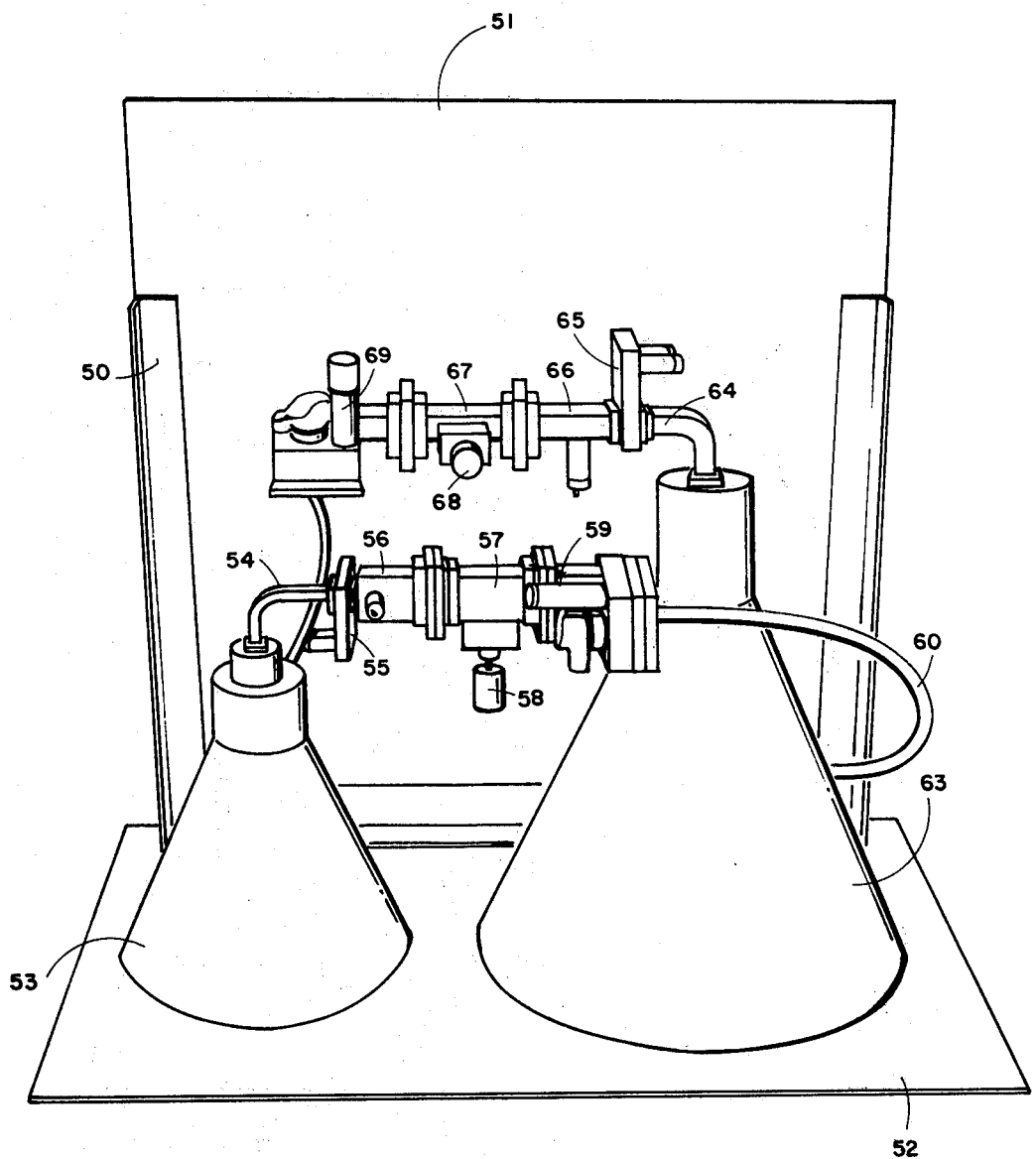
FIG. 3 is a perspective view of one embodiment of a sensing head in accordance with this invention.

The sensing head assembly 10 also includes a second mixer or converter 23, klystron oscillator 24 and multiplier 25 connected in a similar superheterodyne configuration to antenna 12. The klystron oscillator 24 and multiplier 25 have an operating frequency and multiplication factor respectively which produce a second local frequency $fo_2$ which when mixed with the incoming frequency $f_2$ produces the same intermediate frequency IF on lead 26 as is produced by mixer 13. The output of mixer 23 is amplified in amplifier 27 and applied over lead 28 to the switch 19. The physical arrangement of one embodiment of the sensing head assembly 10 is shown in FIG. 3 and described below. It may be physically located remote from the remainder of the signal processing circuitry and therefore is represented as a separate dashed line box in FIG. 1.

The switch 19 is operated by switching signals from a reference oscillator 30 over lead 31. Oscillator 30 also provides synchronizing signals for a synchronous detector 32 over lead 33.

Signals over leads 18 and 28 to the VHF switch are alternately applied to the single output channel of the system including an attenuator 34 and post amplifier and detector 35, an additional amplifier 36 and thence to a synchronous detector 32 and output integrator 37. The output of the system on lead 38 is the signal representing the difference in apparent antenna temperatures at the two frequencies $f_1$ and $f_2$.

In addition to the foregoing elements of the system, FIG. 1 shows a local oscillator supply consisting in practice of a pair of stabilized supply circuitry connected by cables represented by arrows to similar arrows at each respective klystron of the R.F. head assembly 10.

The system of FIG. 1 is designed particularly for fixed installations since the presence of klystron oscillators 14 and 24 in the R.F. head assembly along with their required multipliers tend to increase the weight and cooling equipment needs. In order to insure minimum loss of signal and power, the entire superheterodyne receiver to the IF stage is an integral part of the RF head and moves with the head if the system is operated in a scanning mode.

Figure 2:
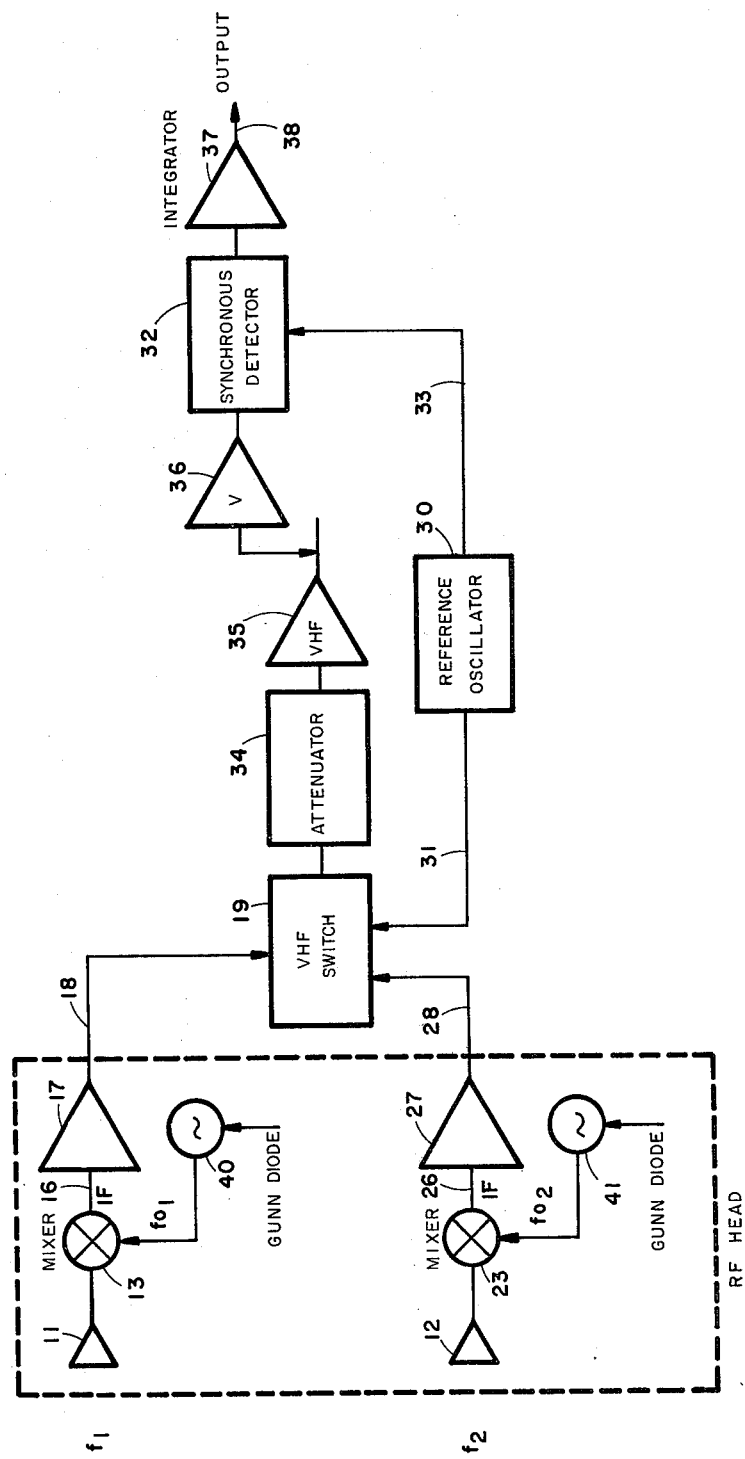
FIG. 2 is a block diagram of another embodiment of this invention.

For airborne or vehicular applications, we have found that a solid state oscillator of the Gunn diode type is preferable to the klystron oscillator and multiplier embodiment of FIG. 1. This improved or at least more portable embodiment is illustrated in FIG. 2. In the embodiment of FIG. 2 the local oscillator signal $fo_1$ associated with the $f_1$ channel in the RF head is furnished by Gunn diode oscillator 40. Similarly, the local oscillator signal $fo_2$ for the $f_2$ channel is furnished by Gunn diode oscillator 41. The remainder of the system remains unchanged and consequently the same reference numerals used in FIG. 1 are applied to the blocks of the system. The operation of the system from the standpoint of signal processing is identical to that of the embodiment of FIG. 1.

The physical arrangement of the RF head of FIG. 1 may best be seen in FIG. 3. There the most prominent elements are a pair of conical antennae 53 and 63 positioned with their ports in a common surface 52. The antenna 53 is typically a 6 inch conical horn subtending a 4.5° angle in the H plane at the 3 db points and a 4.5° angle in the E plane. The antenna 63 typically is a nine inch conical horn with generally similar beam pattern.

The antennae 53 and 63 and all associated electronics are mechanically supported on frame 50 as well as surface 52.

The antenna 53 includes an output wave guide 54 coupled to transmit the vertical component of energy to a mixer 55 which in turn is coupled to a tripler or multiplier 56. Completing the RF components of this assembly are an attenuator 57 which is controllable in level of attenuation by knob 58 and a klystron oscillator 59. The IF output of this channel is conducted via cable 60 to the exterior of the RF head and thence to the switch 19 of FIG. 1, as shown in FIG. 3.

Similarly the antenna 63 which is orthogonally polarized (horizontal plane, for example) is coupled via wave guide 64 to a mixer 65 with its associated double 66 attenuator 67 with its control knob 68 and klystron oscillator 69.

Figure 4:
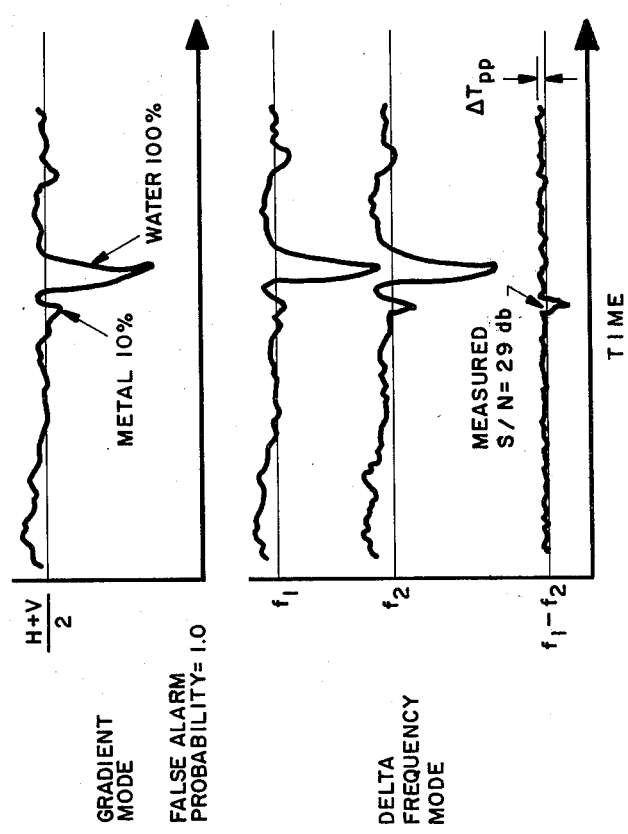
FIG. 4 is a graphical representation of the output characteristics of this invention as compared with other types of detection systems.

Each of the foregoing components are standard microwave components and the novelty of this invention resides in the combination arranged in a manner to provide uniform detection of metal in the field of view. This detection employs the characteristic of metal which we have earlier recognized, that of different apparent temperature in the horizontal and vertical planes. This characteristic is illustrated in FIG. 4 which is represented in the top curve on this page (the average of the two orthogonal components identified as H and V). It is apparent that both metal and water produce marked negative excursions. A water target which fills the beam width of the antenna produces a "cold" target of far greater prominence than a common 10% beamfill metal target. Using a system of the foregoing type detection of cold targets will invariably produce false alarm signals in the presence of water.

The lower three curves of FIG. 4 illustrate the operation of the system of this invention. The uppermost curve shows the apparent temperature at frequencies $f_1$ and $f_2$ for the same field of view as in the case of the gradient mode curve at the top of FIG. 4. The same general characteristics are apparent with a large water target predominating as the most significant characteristic.

According to this invention, the system of FIGS. 1 and 2 combine the two orthogonally polarized components at the different frequencies by a subtraction process leaving a metal target as the only significant excursion in the curves. As is apparent in this bottom curve $f_1 - f_2$, the 10% beamfilling metal target predominates over all other targets including a 100% beamfilling water.

Figure 5:
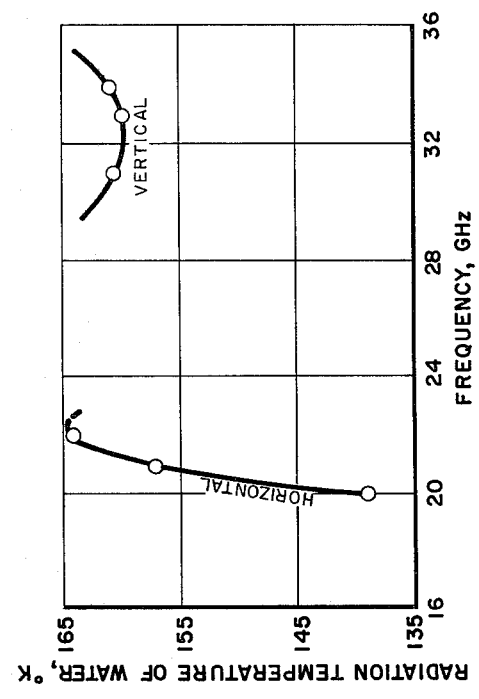
FIG. 5 is a graphical representation of the effective temperature of water as a function of frequency in orthogonal planes.
Figure 7:
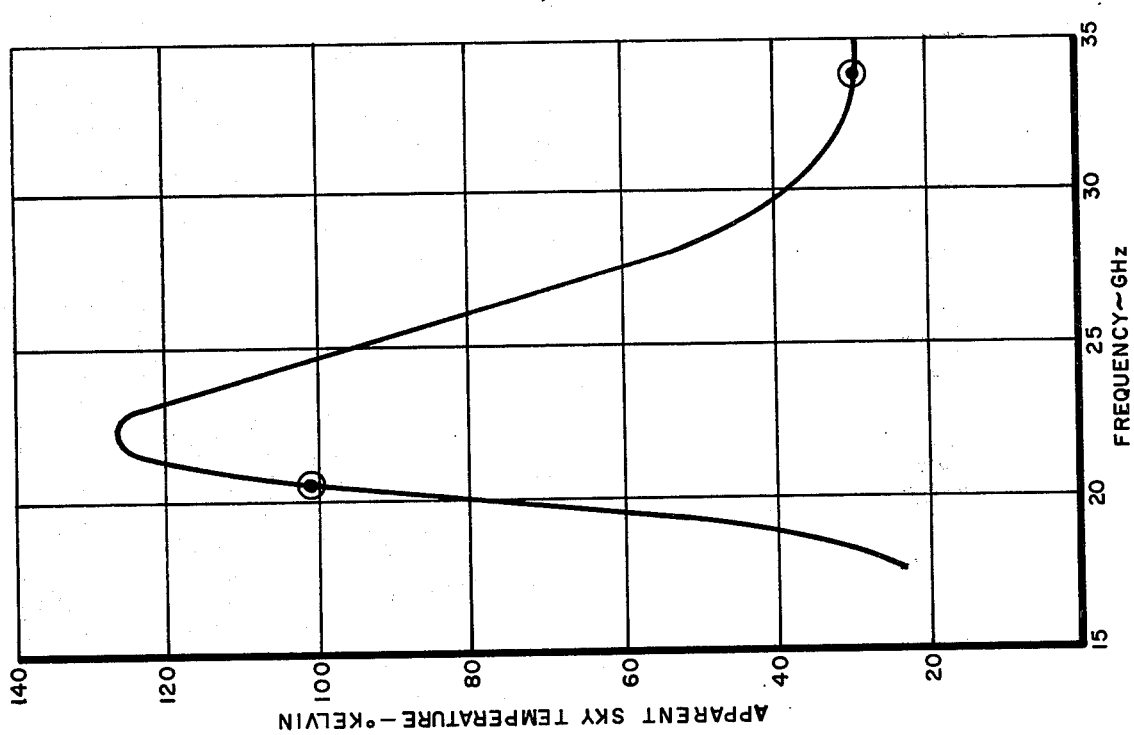
FIG. 7 is a graphical representation of the apparent sky temperature as a function of frequency.

The successful operation of the system of this invention depends not only upon the difference in polarization but particularly in the selection of operating frequencies. Referring now to FIG. 5 which shows the radiation temperature of water in degrees Kelvin in both the horizontal and vertical planes, it should be noted that the horizontal component is markedly frequency dependent in the 20 to 24 GHz range while the vertical polarized component exhibits a relatively constant radiation temperature in the 30-34 GHz range. At frequencies of 20 GHz in the horizontal plane and 34 GHz in the vertical plane the radiation temperature of water is substantially equal at approximately 160°K. At the same two frequencies the differential in sky temperature is maximized as is apparent in FIG. 7. Since a metal object tends to be an efficient reflector it will exhibit the characteristics of the sky. On the other hand apparent temperature of water at 21 GHz is given by:

$$Tw_{21} = \epsilon_{21} Ts + \rho_{21} Ts_{21}$$

and of water at 34 GHz by $$Tw_{34} = \epsilon_{34} Ts + \rho_{34} Ts_{34}.$$

Figure 6:
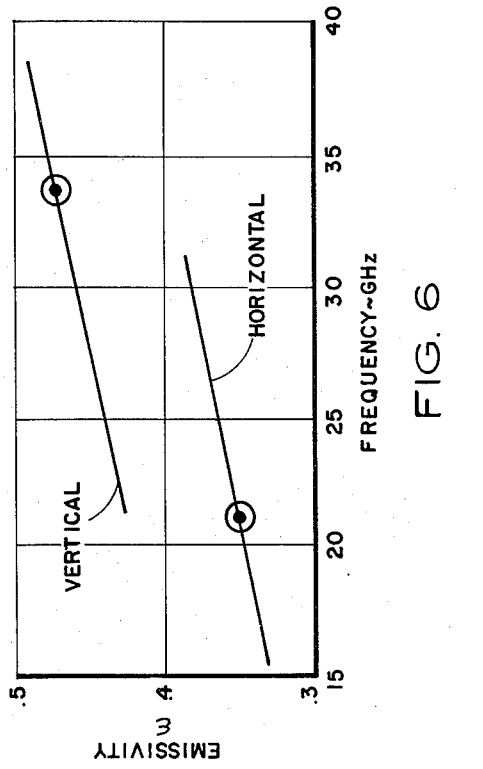
FIG. 6 is a graphical representation of the comparative emissivity of water in two orthogonal planes at different frequencies.

The higher sky temperature at 21 GHz is balanced by the higher emissivity term at 34 GHz as shown in FIG. 6.

Other terrain features exhibit no differential return and consequently provide no interfering signal for the system. It is apparent from the foregoing that any frequencies which meet all of the foregoing criteria can be selected as $f_1$ and $f_2$, indeed these may be harmonocally related, and the system modified accordingly.

Figure 8:
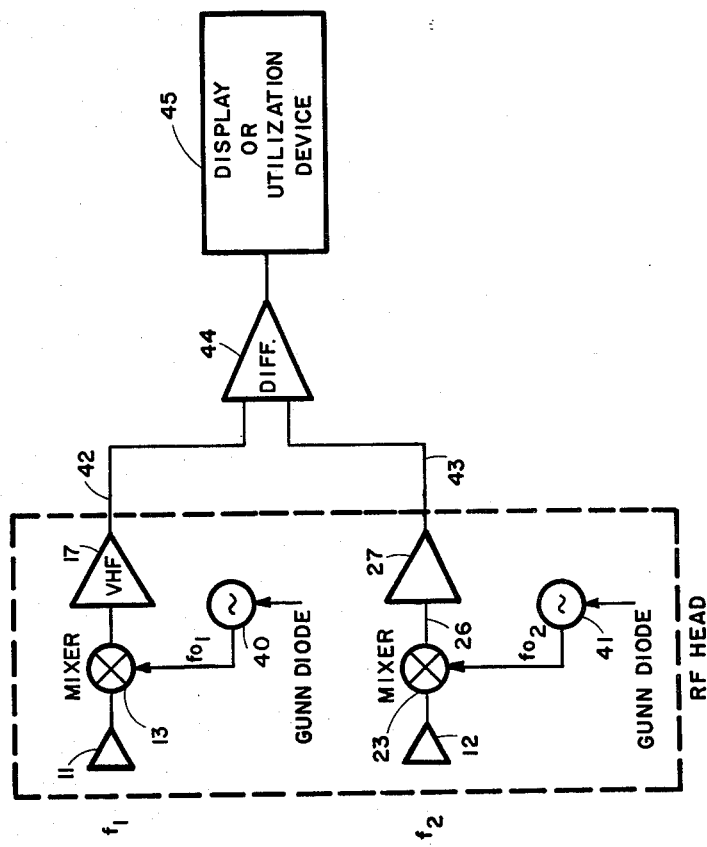
FIG. 8 is a block diagram of a third embodiment of this invention.

An example of a simplified form of this system in accordance with this invention eliminates the multiplexing feature of the switch 19. In FIG. 8 the same components of FIG. 2 are illustrated and identified by the same reference numerals. In this embodiment however, the output of amplifiers 17 and 27 is taken on leads 42 and 43 respectively and introduced into a differential amplifier 44 producing only difference signals for representation or use on a display or utilization device 45. Since differential signals are the only significant ones for metal target detection, the system of FIG. 8 is perfectly effective for metal target detection.

The above described embodiments of this invention are merely descriptive of its principles and are not to be considered limiting. The scope of this invention instead shall be determined from the scope of the following claims including their equivalents.

HARMONICALLY RELATED DUAL FREQUENCY SYSTEM

Above we have described a species of this invention in which a pair of frequencies have been selected to optimize the detectability of metal targets in the presence of water background. In such species, the selected mixing frequencies are each generated by independent oscillators.

Figure 9:
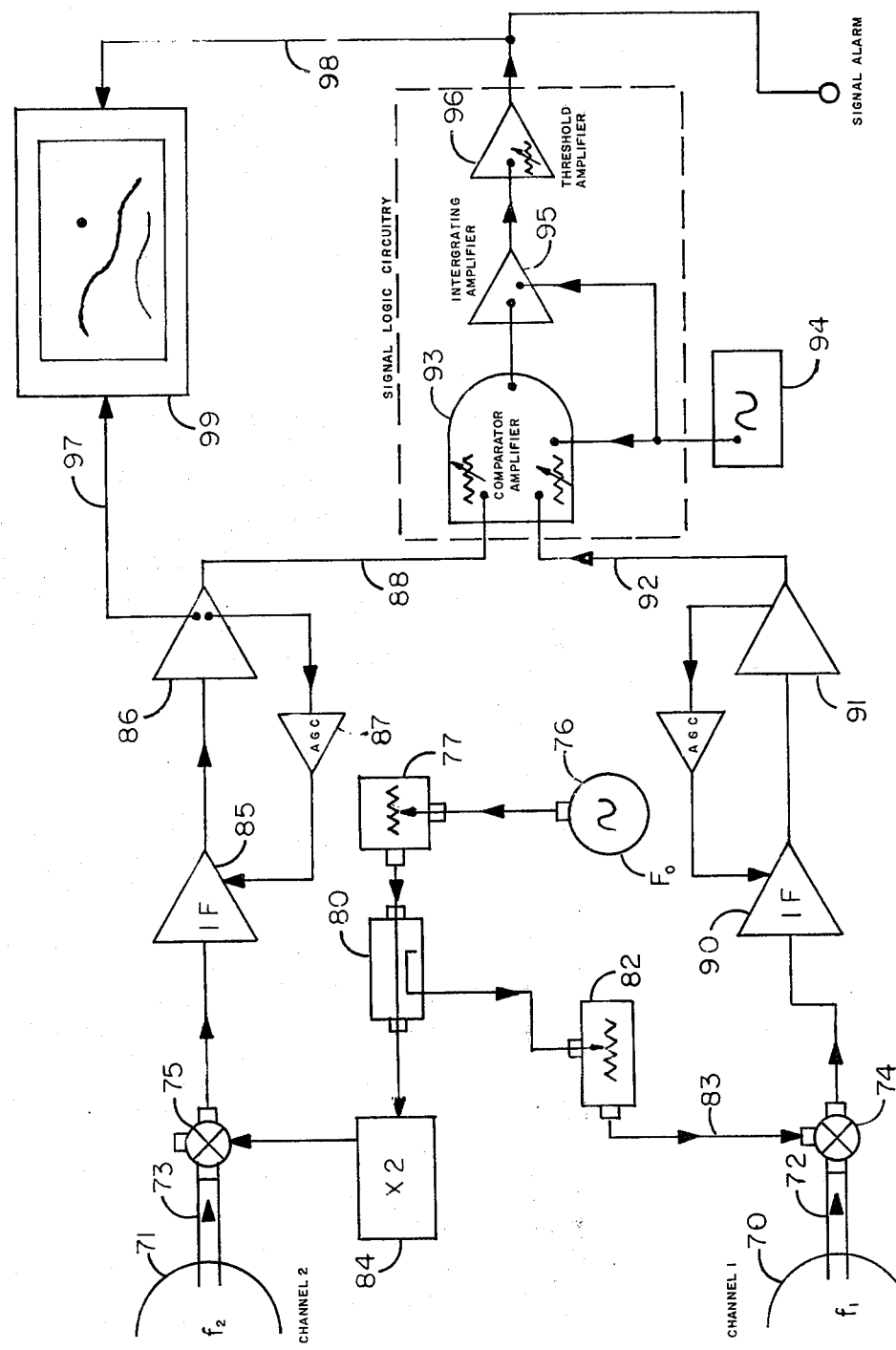
FIG. 9 is a block diagram of a fourth embodiment of this invention.

We have found that in certain circumstances the use of a single local oscillator and a multiplier to produce harmonically related frequencies for the two channels is advantageous. Such an embodiment is shown in FIG. 9. This embodiment includes a pair of antennae 70 and 71 such as Cassegrainian parabolas with associated waveguides 72 and 73 connected to respective mixers 74 and 75. The two mixers 74 and 75 are both referenced to a local signal from the same source, local oscillator 76 producing a signal $f_o$.

The basic local oscillator 76 is preferably is a Gunn diode which generates approximately 100 mw at $f_o$ which may be 20 GHz, for example. Energy from this oscillator is coupled via a 3 db attenuator 77, directional coupler 80, probe 81, attenuator 82, and lead 83 to the mixer 74.

Energy from oscillator 76 is also passed through coupler 80 to a multiplier 84 and then to mixer 75. The multiplier 84 is a doubler so the mixing frequency at mixer 72 is $2f_o$ and the incoming energy $f_2$ is heterodyned in mixer 75 to produce an IF signal. This channel 2 IF signal is amplified in IF amplifier 85 and detected and the resultant video signal is amplified in detector-amplifier 86. Stability of the signal detection process is further enhanced by an automatic gain control loop including AGC amplifier 87. A similar IF detector video amplifier and AGC circuit is included in channel 1 is represented by IF amplifier 90, detector-video amplifier 91 and an AGc amplifier. The detector amplifier circuits employed are typically those used in conventional radio receivers where the signal to be detected appears as amplitude modulation on the intermediate frequency. The detector is simply a well known envelope detector and employs automatic gain or volume control. The principles of the detection, amplification and automatic gaining control employed herein are in accordance with well known teaching in the art, for example, Chapter 10 of RADIO ENGINEERING by Terman, third edition, copyright 1951.

The channel 1 and 2 signals appearing on leads 88 and 92 are introduced into a comparator amplifier 93 which produces a signal output which is representative of the difference between the two channels. The combined outputs of channels 1 and 2 are alternately sampled at rates in the order of 1 Hz to 10,000 Hz under the control of a timing oscillator 94. When the levels of alternately switched signals are equal a zero output amplifier 93 exists. Any difference output is integrated in integrating amplifier 95 synchronized by oscillator 94. Since the two antennae 70 and 71 have a substantially identical field of view, the difference signal is truly representative of the difference in radiometric temperature of the field of view at the two frequencies. Although the absolute temperatures may vary, a relative change in temperature at the two frequencies indicates a recordable event, e.g. the detection of metal amid natural background.

The integrated difference signal 96 is introduced into a threshold amplifier 96 with a controllable threshold. The alarm threshold is adjusted depending upon the minimum size of target to be detected.

One further feature of this invention is also apparent in FIG. 9. The system derives both the detected radiometric signatures within the field of view at two frequencies and the difference characteristic at the two frequencies. The signature is available at the output of detector amplifiers 91 and 86. Either of these signals may be applied to a display to present a radiometric map display. A typical display device is a B scan oscilloscope or a falling raster display device both of which are well known in the art.

In FIG. 9 the detected radiometric signal at frequency $f_2$ is directed from detector-amplifier 85 on lead 97 and introduced into display device 99. Additionally the difference signal from threshold amplifier 96 is introduced over lead 98 to the display 99. Typically this signal can be in the form of a Z modulation signal to provide a bright spot on the display in contrast to the map background as illustrated in the drawing.

SUMMARY

In the foregoing embodiment of this radiometric system, two frequencies are used. The solution of these operating frequencies is a fundamental part of this invention. For example, as described above in connection with FIGS. 1 and 2, selection of the frequencies will depend on the specific material to be identified. Thus, to distinguish metal from terrain features, a band from $20.5 \pm 0.5$ GHz for $f_1$ and from $41 \pm 1$ GHZ for $f_2$ would be selected. The exact frequency within this range is a weather dependent function.

To distinguish water from natural features while assuring a highly stabilized background, a choice of $10.3 \pm 0.25$ GHz for $f_1$ and $20.6 \pm 0.5$ GHz for $f_2$ would be preferred.

To distinguish tarmac from natural landscape features while assuring a highly stabilized background, a choice of $8.5 \pm 0.5$ GHz for $f_1$ (horizontal polarization) and of $17 \pm 1.0$ GHz for $f_2$ (vertical polarization) would be preferred.

To distinguish fresh water from sea water, we select $800 \pm 50$ MHz for $f_1$ and $1600 \pm 100$ MHz for $f_2$. It should be noted that in each of the cases above the operating frequencies may be so chosen as to be harmonically related thereby allowing the use of the embodiment of FIG. 9. Since a single basic oscillator is used and the signals are differentially combined in this embodiment, oscillator drift and noise being identical in both channels are cancelled thereby enhancing the signal-to-nose ratio of the system.

We claim:

1. A system for the detection of metal objects in the presence of interfering background including water comprising:
    a pair of radiometric receivers including energy receiving ports positioned to receive energy from substantially the same field of view,
    one of said receivers tuned to a frequency $f_1$ and the second of said receivers tuned to a frequency $f_2$,
    means for converting incoming energy at said ports to a common IF frequency,
    means for sensing the difference in level of energy received at said two frequencies indicative of the presence or absence of metal in the field of view, said frequencies $f_1$ and $f_2$ being characterized as having detectable different apparent sky temperature and approximately identical apparent water temperature.

2. The combination in accordance with claim 1 wherein said energy receiving ports are polarized to receive energy in two orthogonal axes.

3. The combination in accordance with claim 1 wherein energy received by one energy receiving port may be represented as $$T_{f_1} = \epsilon_{f_1} T_o + \rho_{f_1} T_{s f_1}$$

and
    the energy received by the second receiver may be represented by $$T_{f_2} = \epsilon_{f_2} T_o + \rho_{f_2} T_{s f_2}$$

where
    $T_{f_1}$ is the absolute temperature in degrees Kelvin of water at the frequency $f_1$,
    $T_{f_2}$ is the absolute temperature in degrees Kelvin of water at the frequency $f_2$.
    $\epsilon_{f_1}$ is the emissivity of water at frequency $f_1$,
    $\epsilon_{f_2}$ is the emissivity of water at frequency $f_2$,
    $\rho_{f_1}$ is the reflectivity of water at frequency $f_1$,
    $\rho_{f_2}$ is the reflectivity of water at frequency $f_2$,
    $T_{s f_1}$ is the apparent sky temperature at frequency $f_1$, and
    $T_s f_2$ is the apparent sky temperature at frequency
    $T_o$ is the ambient thermametric temperature and the frequency $f_1$ and $f_2$ are selected whereby $$T_{f_1} \approx T_{f_2}.$$

4. The combination in accordance with claim 1 wherein said pair of radiometric receivers include local oscillator means for producing said frequencies $f_1$ and $f_2$, said local oscillator means comprising a single oscillator operating at the frequency $f_1$ and including multiplier means for producing the frequency $f_2$ as a harmonic of the frequency $f_1$.

5. The combination in accordance with claim 1 wherein said frequencies are in the order of $$f_1 \approx 20 \text{ GHz}$$

and $$f_2 \approx 34 \text{ GHz}$$

6. The combination in accordance with claim 5 wherein the energy receiving port of the radiometric receiver tuned to frequency $f_1$ is polarized to receive energy in the horizontal plane.

7. The combination in accordance with claim 5 wherein the energy receiving port of the radiometric receiver tuned to frequency $f_2$ is polarized to receive energy in the vertical plane.

8. A dual frequency radiometer comprising
    a first antenna tuned to receive energy at a selected frequency $f_1$,
    a second antenna tuned to receive energy at a selected frequency $f_2$,
    a first local oscillator, a first mixer coupled to said first antenna and first local oscillator to produce an intermediate frequency IF, a second local oscillator, a second mixer coupled to said second antenna and second local oscillator, said second local oscillator tuned to provide the same intermediate frequency IF from said second mixer when combined with energy at said frequency $f_2$, Switch means for alternately applying an IF signal from the first and second mixers to a common output signal channel, a synchronous detector for energy from said switch means, and output means for producing a signal representative of the difference in level of received energy at said two antennae.

9. The combination in accordance with claim 8 wherein said first and second antennae are polarized in two orthogonal planes.

10. A radiometric system for detecting one material in a field of view containing different background material comprising:

a first polarized antenna directed toward a field of interest, a second antenna directed toward substantially the same field of interest orthaganally polarized with respect to said first antenna, a local oscillator for producing a frequency $f_o$, first mixing means connected to said first antenna and said local oscillator to produce an intermediate frequency from the product of incoming energy at said first antenna and the output of said local oscillator, a multiplier connected to said local oscillator for producing a frequency $n_{f_o}$, second mixing means connected to said second antenna and said multiplier to produce an intermediate frequency from the product of incoming energy at said second antenna and the outupt of said multiplier, first and second detector means connected to respective first and second mixing means for producing video signals representative of incoming energy at two different frequencies $f_1$ and $f_2$, means for differentially combining said video signals to produce a difference signal, threshold means for passing signals from said combining means having a level above a preselected threshold, a means for displaying signals above said threshold.

11. The combination in accordance with claim 10 wherein said multiplier is a frequency doubler.

12. The combination in accordance with claim 10 including means connected to one of said detector means for displaying the signal output of said detector means as a representation of the radiometric temperature of the field of view of the antenna associated with said detector means.

13. The combination in accordance with claim 12 including means for introducing the output of said threshold means into said display device to provide a signal indicative of a detected event superimposed upon the display of the output of said detector means.

14. The combination in accordance with claim 10 wherein said system is operative to detect metal in a background of terrain features and said frequency $f$ is in the range of 20.5 ± 0.5 GHz and said frequency $f_2$ is in the range of 41 ± 1 GHz.

15. The combination in accordance with claim 10 wherein said system is operative to detect water in a background of natural terrain features and said frequency $f_1$ is in the range of 10.3 ± 0.25 GHz. and said frequency $f_2$ is in the range of 20.6 ± 0.5 GHz.

16. The combination in accordance with claim 10 wherein said system is operative to detect tarmac in a background of natural terrain features and said frequency $f_1$ is in the range of 8.5 ± 0.5 GHz and said frequency $f_2$ is in the range of 17 ± 1.0 GHz.

17. The combination in accordance with claim 10 wherein said system is operative to detect fresh water in a background of sea water and said frequency $f_1$ is in the range of 800 ± 50 MHz and said frequency $f_2$ is in the range of 1600 ± 100 MHz.

\* \* \* \* \*